Feb. 14, 1956  A. GREENBAUM  2,735,078
ELECTRIC ATTACHMENT PLUG RECEPTACLE HAVING INSULATION
PENETRATING MEANS CONTACTING TURN CONDUCTORS
Filed March 26, 1954

INVENTOR
Arthur Greenbaum
BY
ATTORNEY

United States Patent Office

2,735,078
Patented Feb. 14, 1956

2,735,078

ELECTRIC ATTACHMENT PLUG RECEPTACLE HAVING INSULATION PENETRATING MEANS CONTACTING TWIN CONDUCTORS

Arthur Greenbaum, Tuckahoe, N. Y., assignor to Academy Electrical Products Corporation, New York, N. Y., a corporation of New York Application March 26, 1954, Serial No. 419,019

10 Claims. (Cl. 339—99)

This invention relates to cord plug receptacles for tapping a main two-conductor flat cord to receive a cord plug branch cord extension and, more particularly, to a cord plug receptacle which can be tapped at any point on a flat type, two-conductor cord without either slitting of the cord to separate the conductors or stripping of insulation from the conductors, and without the use of tools.

It is often necessary or desirable to add an extra outlet, or a branch, to a cord. For example, such a cord may frequently be secured in position to avoid entanglement or pulling over of an appliance by someone tripping on the cord. In such case, the usual receptacle or outlet on the cord may be inconveniently located for ready access.

To add an outlet or branch requires slitting of the cord, stripping of insulation from the conductors, making joints with the bared conductors, and taping up the joint. This is not only a complicated operation for an unskilled person but also the resulting joint may be unsafe and dangerous both electrically and mechanically. In any event, it is unsightly.

The present invention is directed to a cord plug receptacle which may be used to provide a cord plug receiving outlet at any desired point on a flat type, two conductor extension cord in a simple, neat and efficient manner. Thereby, the cord may be branched by inserting the plug of another cord into the invention receptacle.

To this end, the receptacle of the invention comprises hingedly interconnected base and cover members of dielectric material arranged to be secured transversely of the cord. One of these members is provided with a pair of spaced slots to receive the blades or prongs of a cord plug, and has inset therein a pair of identical contact springs each in operative relation to one of the slots for engagement by a cord plug prong. The contact springs are separated by a transverse partition or rib inset from an edge of the member to form a partial channel. Each spring contact is formed with a barb or point projecting across such channel and beyond such edge of the member.

The other member is formed with a transverse channel having extended side walls projecting beyond an edge of the member for projection into the contact carrying member. This channel is shaped to have a flat type, two-conductor extension cord lie along and fill the channel. When the members are closed on each other, the contact spring barbs pierce the insulation of a cord in the channel, and each barb pierces a different conductor of the cord. The barbs thus mechanically and electrically connect the contact springs to the cord conductors. A releasable latch on one member releasably engages an abutment on the other member to lock the receptacle on the cord.

For an understanding of the invention principles, reference is made to the following description of a typical embodiment thereof as illustrated in the accompanying drawing. In the drawing.

Figure 2:
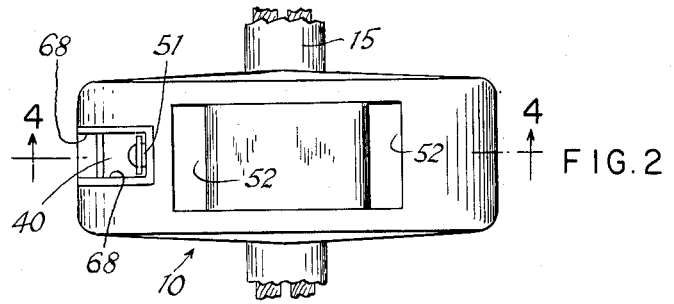
Figs. 1, 2 and 3 are, respectively, left end elevation, top plan, and right end elevation views of the cord plug receptacle of the invention.
Figures 1, 3, 4:
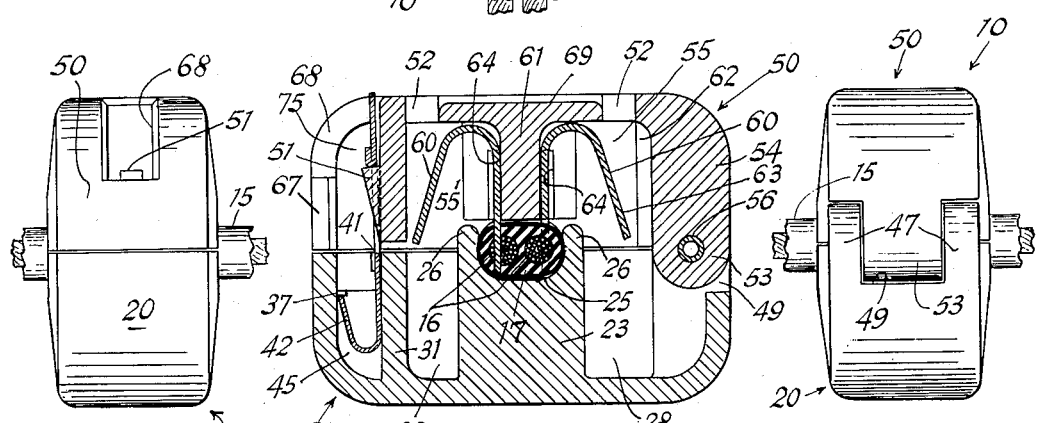
Fig. 4 is a vertical sectional view of the receptacle as attached to a cord.

Referring to the drawing, the cord plug receptacle 10 includes a base 20, molded from a suitable dielectric plastic composition material, to which is hingedly attached a cover 50 also molded from a suitable plastic composition material. Base 20 carries a latch spring 40 releasably engageable with a latch abutment 51 on cover 50. The cover 50 receives identical contact springs 60, of conductive material, arranged in operative relation to slots 52, 52 for receiving the blades or prongs of a cord plug.

Figure 5:
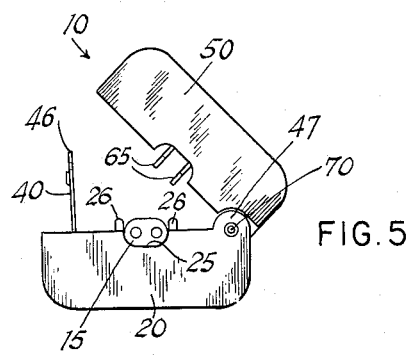
Fig. 5 is a side elevation view of the receptacle open for attachment to a cord.

Base 20 is formed with a transversely extending channel 25 arranged to have a flat type cord 15 extend therealong, cord 15 including two conductors 16 embedded in insulation 17. To attach receptacle 10 to cord 15, latch 40 is released and the cover and base are swung apart, as in Fig. 5. The cover and base are then closed on cord 15 so that barbs 65 on springs 60 pierce insulation 17 and conductors 16. Latch spring 40 snaps over abutment 51 to latch the cover and base in closed position.

The flanges or side walls 26 of channel 25 extend somewhat above the upper surface 21 of base 20, and the base of channel 25 has recesses 27 aligned with barbs 65 when the receptacle 10 is closed. Side walls 22 extend from a thick central rib 23, in which channel 25 is formed, toward a somewhat thicker end wall 24. Rib 23, side walls 22, and end wall 24 define a recess 28 to accommodate a blade or prong of a cord plug inserted into cover 50.

A second blade accommodating recess 29 is defined by rib 23, side walls 22, and an intermediate partition 31 extending somewhat beyond surface 21. Partition 31, with thickened side wall portions 32 and end wall 33 defines a seating recess 45 for latch spring 40. Wall portions 32 are formed with inner ledges 34 acting as seats for shoulders 41 on spring 40. A ledge 36 on end wall 33 has projections 37 arranged to snap over the edge of a bent end 42 on spring 40 to lock the spring in recess 45.

The straight portion of spring 40 is formed with an elongated, substantially rectangular opening 43 whose upper edge is formed by a tongue 44 bent back upon itself. This forms a double thickness, rounded "bearing" engageable with abutment 51, which "rolls off" abutment 51 when spring end 46 is pulled outwardly to disengage latch 40 from abutment 51.

Adjacent the hinge end of base 20, side walls 22 are thickened and have upward extensions or ears 47. These ears have axially aligned apertures 48 to receive a hinge pintle 70 in the form of a hollow or tubular pin which extends through an aperture 56 in a hinge pintle or ear 53 on the hinge end wall 54 of cover 50. Wall 24 of base 20 is recessed, as at 49 to accommodate ear 53, and side walls 57 of cover 50 are recessed, as at 58, to accommodate ears 47.

Side walls 57, with end wall 53 and a thick transverse central and inset rib 61 define a recess 55 for one contact spring 60. Wall 53 has ribs 62 acting as stops for the plug blade engaging end 63 of one spring 60. The barb carrying end of spring 60 seats in slots 64 at the junctures of walls 57 with central rib 61. This end of the contact spring is slit to form tongues which dig into cover 50 to lock the spring in position, and is formed with a barb 65 projecting from its outer end.

The other contact spring 60 is identical with that described, and is locked in place in a recess 55' in the same manner as described. Recess 55' is defined by rib 61, side walls 57 and a partition or web 66 inset below the outer edges of side walls 57 to form a seat for web 31 of base 20. Web 66, with side walls 57 and end wall 67 defines a latch spring receiving recess 75. A slot 68 is formed in end wall 67 and top wall 69 receives, and allows access to the end 46 of spring 40.

Figure 6:
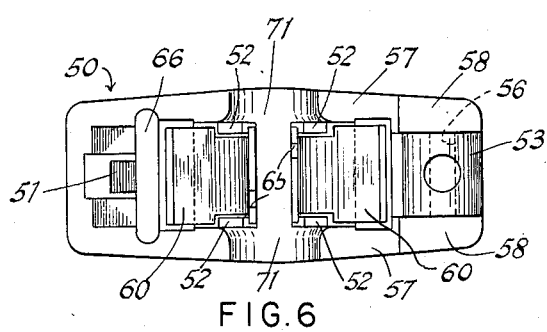
Fig. 6 is a bottom plan view of the cover member.
Figure 8:
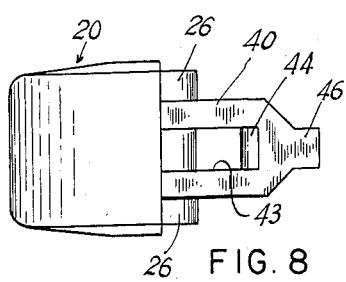
Fig. 8 is a latch end elevation view of the base member.
Figure 7:
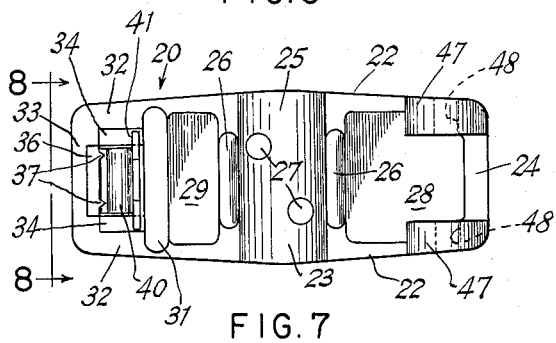
Fig. 7 is a top plan view of the base member.

Side walls 57, adjacent central rib 61 are arcuately recessed, as at 71 (Figs. 6 and 7), to define, with channel 25, the passage for cord 15. The thickness of rib 61 is such that channel flanges 26 embrace this rib when the receptacle is closed, thus completely laterally confining cord 15.

The cover and base are assembled by driving pin 70 through ears 47, 47 and 53. The receptacle is then ready for attachment to a cord 15, in the manner already described. The cooperation of channel flanges 26 with rib 61 accurately locates cord 15 in channel 25. Rib 61 also separates the opposite polarity contact springs 60. It will be noted that the ends 63 of these springs are sprung inwardly when cord plug blades are inserted through slots 52, maintaining firm contact with the blades.

Contrary to other receptacles and attachment devices, the invention receptacle requires no slitting of cord 15 to separate conductors 16, and no stripping of the conductors.

While a specific embodiment of the invention has been shown and described in detail to illustrate the application of the invention principles, it will be understood that the invention may be embodied otherwise without departing from such principles.

What is claimed is:

1. A cord plug receptacle for tapping a flat type two-conductor cord without slitting of the cord of stripping of the conductors; said receptacle comprising, in combination, first and second elongated members of dielectric material arranged to be separated to receive a cord therebetween with the members extending transversely of the cord, and having mating inner faces formed to co-operatively provide a single cord receiving passage extending transversely of said members; interengageable releasable latch means on said members operable to clamp said members onto the cord; said first member having a pair of slots spaced longitudinally of its outer surface to receive the blades of a cord plug; and a pair of conductive contact springs mounted within said first member, each in operative relation to one of said slots to contact a cord plug blade; each spring having a portion extending along such passage and formed with a barb projecting into the passage to pierce the insulation of a cord therein and a conductor of the cord when said members are clamped onto the cord, the barbs being spaced laterally of the channel whereby each barb will pierce a different cord conductor to electrically connect its associated contact spring to such conductor.

2. A cord plug receptacle as claimed in claim 1 in which said second member has recesses in its inner face each aligned with one of said slots to accommodate a cord plug blade.

3. A cord plug receptacle as claimed in claim 1 in which said passage includes a channel formed in the inner surface of said second member and having side walls extendable into said first member in overlapping laterally spaced relation to said barbs.

4. A cord plug receptacle as claimed in claim 1 in which said passage includes a transverse rib in said first member, recessed inwardly of the inner face thereof, and separating and positioning the barbed portions of said contact spring.

5. A cord plug receptacle for tapping a flat type two-conductor cord without slitting of the cord or stripping of the conductors; said receptacle comprising, in combination, first and second elongated members of dielectric material arranged to be separated to receive a cord therebetween with the members extending transversely of the cord, and having mating inner faces formed to cooperatively provide a single cord receiving passage extending transversely of said members; means hingedly interconnecting said members at one end thereof; interengageable releasable latch means on the other ends of said members operable to clamp said members onto the cord; said first member having a pair of slots spaced longitudinally of its outer surface to receive the blades of a cord plug; and a pair of conductive contact springs mounted within said first member, each in operative relation to one of said slots to contact a cord plug blade; each spring having a portion extending along such passage and formed with a barb projecting into the passage to pierce the insulation of a cord therein and a conductor of the cord when said members are closed onto the cord, the barbs being spaced laterally of the channel whereby each barb will pierce a different cord conductor to electrically connect its associated contact spring to such conductor.

6. A cord plug receptacle as claimed in claim 5 in which said second member has recesses in its inner face each aligned with one of said slots to accommodate a cord plug blade.

7. A cord plug receptacle as claimed in claim 5 in which said passage includes a channel formed in the inner surface of said second member and having side walls extendable into said first member in overlapping laterally spaced relation to said barbs.

8. A cord plug receptacle as claimed in claim 5 in which said passage includes a transverse rib in said first member, recessed inwardly of the inner face thereof, and separating and positioning the barbed portions of said contact spring.

9. A cord plug receptacle as claimed in claim 5 in which said releasable latch means includes a latch spring mounted in the free end of said second member and extending into an outwardly open latching recess in the free end of said first member and engageable with a fixed abutment projecting into said latching recess.

10. A cord plug receptacle as claimed in claim 5 in which said releasable latch means includes a latch spring mounted in the free end of said second member and extending into an open latching recess in the free end of said first member and engageable with an abutment projecting into said latching recess; said latch spring having an operating end projecting through said latching recess for access from the outer surface of said first member.

References Cited in the file of this patent

UNITED STATES PATENTS

| | | |
|---|---|---|
| 2,408,045 | Cottrell | Sept. 24, 1946 |
| 2,510,745 | Kilgore | June 6, 1950 |
| 2,655,639 | Benander et al. | Oct. 13, 1953 |